(12) United States Patent
Oplustil et al.

(10) Patent No.: US 12,498,063 B2
(45) Date of Patent: Dec. 16, 2025

(54) PROFILE CLAMP, FLANGE CONNECTION, AND TURBOCHARGER COMPRISING SAME

(71) Applicant: NORMA Germany GmbH, Maintal (DE)

(72) Inventors: Julius Oplustil, Hustopece (CZ); Rudolf Polivka, Hustopece (CZ); Lukas Dolezal, Hustopece (CZ); Lukas Polasek, Hustopece (CZ); Jiri Zukal, Hustopece (CZ); Martin Repka, Hustopece (CZ)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 18/270,776

(22) PCT Filed: Jan. 6, 2022

(86) PCT No.: PCT/EP2022/050193
§ 371 (c)(1),
(2) Date: Jul. 3, 2023

(87) PCT Pub. No.: WO2022/167168
PCT Pub. Date: Aug. 11, 2022

(65) Prior Publication Data
US 2024/0052959 A1 Feb. 15, 2024

(30) Foreign Application Priority Data

Feb. 3, 2021 (DE) .................... 10 2021 102 524.9

(51) Int. Cl.
*F16L 23/08* (2006.01)
*F01D 25/24* (2006.01)
(Continued)

(52) U.S. Cl.
CPC ............ *F16L 23/08* (2013.01); *F01D 25/243* (2013.01); *F04D 29/4206* (2013.01); *F16L 23/003* (2013.01); *F05D 2260/39* (2013.01)

(58) Field of Classification Search
CPC ............ F05D 2260/39; F05D 2230/64; F05D 2230/642; F16L 23/08; F16L 23/10;
(Continued)

(56) References Cited

U.S. PATENT DOCUMENTS 2,214,381 A * 9/1940 Rastetter ................. F16B 2/065
403/81
2,675,253 A * 4/1954 Stade ...................... F16L 23/10
285/410

(Continued)

FOREIGN PATENT DOCUMENTS

DE 19514940 C1 * 10/1996 ............ F16L 21/005
DE 10056182 A1 * 5/2002 ............ F01N 13/00
(Continued)

OTHER PUBLICATIONS

German Office Action for German Application No. 10 2021 102 524.9 dated Oct. 12, 2021 (4 pages).

(Continued)

*Primary Examiner* — Topaz L. Elliott
(74) *Attorney, Agent, or Firm* — REISING ETHINGTON, P.C.

(57) ABSTRACT

A profile clamp includes a profile strip which extends in a circumferential direction about a clamp center and has two clamping heads which are connected to one another via a clamping element. A profile groove running in the circumferential direction is formed on an inside of the profile strip and has a profile strip base arranged at least in portions between groove flanks. The profile clamp has a securing feature on the inside of the profile strip, which protrudes into (Continued)

the profile groove and/or from the profile strip base in the direction of the clamp center. A flange connection and a turbocharger are also presented.

6 Claims, 7 Drawing Sheets

(51) Int. Cl.
*F04D 29/42* (2006.01)
*F16L 23/00* (2006.01)

(58) Field of Classification Search
CPC ......... F16L 23/003; F16L 23/04; F16L 23/06; F01D 25/24; F01D 25/243; F16B 2/08; F16B 2/10; F16B 2/065; F16B 2200/509; F16B 7/0426; F01N 13/1872; F01N 13/1805
See application file for complete search history.

(56) References Cited

U.S. PATENT DOCUMENTS

| | | | | |
|---|---|---|---|---|
| 3,361,400 | A * | 1/1968 | Webb | F16B 2/08 248/27.1 |
| 3,520,563 | A * | 7/1970 | Decker, Jr. | F16L 23/04 24/456 |
| 3,757,283 | A * | 9/1973 | Kelly | F16B 2/08 24/135 R |
| 4,185,858 | A * | 1/1980 | Peash | F16L 23/18 277/626 |
| 5,224,825 | A * | 7/1993 | Strang | F01D 25/246 415/189 |
| 5,549,449 | A * | 8/1996 | McInerney | F01D 25/243 384/473 |
| 9,212,769 | B2 | 12/2015 | Rigollet et al. | |
| 10,982,801 | B2 * | 4/2021 | Lecbych | F16L 23/08 |
| 11,015,487 | B2 | 5/2021 | Eriksson | |
| 11,549,624 | B2 | 1/2023 | Jacquelin et al. | |
| 11,946,575 | B2 * | 4/2024 | Carter | F16L 23/003 |
| 2002/0171244 | A1 * | 11/2002 | Wachter | F16L 21/08 285/373 |
| 2005/0264010 | A1 | 12/2005 | Wagner | |
| 2011/0181037 | A1 * | 7/2011 | Griffin | F02B 37/02 285/365 |
| 2017/0292643 | A1 * | 10/2017 | Prevot | F16L 23/08 |
| 2018/0223692 | A1 | 8/2018 | Eriksson | |
| 2019/0145559 | A1 * | 5/2019 | Karlsson | F16L 23/08 285/411 |
| 2019/0186514 | A1 * | 6/2019 | You | F16B 2/08 |
| 2019/0211953 | A1 * | 7/2019 | Lecbych | F16B 2/065 |
| 2021/0285577 | A1 * | 9/2021 | Chen | F16L 55/07 |
| 2021/0324982 | A1 * | 10/2021 | Koehler | F16L 23/08 |
| 2022/0235888 | A1 | 7/2022 | Carter et al. | |
| 2022/0397218 | A1 * | 12/2022 | Akremi | F01N 13/1805 |
| 2024/0077157 | A1 * | 3/2024 | von Breitenbach | F16L 23/08 |

FOREIGN PATENT DOCUMENTS

| | | | | |
|---|---|---|---|---|
| DE | 102009039862 | A1 | 9/2011 | |
| DE | 102019112884 | B3 | 3/2020 | |
| DE | 102023105434 | A1 * | 9/2023 | ............ F16L 23/003 |
| EP | 1600680 | A1 | 11/2005 | |
| EP | 2876344 | A1 * | 5/2015 | ............ F16L 33/025 |
| EP | 3825594 | A1 | 5/2021 | |
| GB | 126655 | A * | 5/1919 | |
| JP | 2018532953 | A | 11/2018 | |
| JP | 2022527354 | A * | 6/2022 | |
| KR | 100674606 | B1 * | 1/2017 | |
| KR | 20190048428 | A | 5/2019 | |
| WO | WO-2005111488 | A1 * | 11/2005 | ............. F16L 23/04 |
| WO | WO-2014088137 | A1 * | 6/2014 | ............ F16L 23/003 |
| WO | WO-2016037686 | A1 * | 3/2016 | ............ F01D 25/243 |
| WO | WO2020037029 | A1 | 2/2020 | |

OTHER PUBLICATIONS

International Search Report for International Application No. PCT/EP2022/050193 dated Mar. 31, 2022 (4 pages).
English Translation of International Search Report for International Application No. PCT/EP2022/050193 dated Mar. 31, 2022 (2 pages).
JP Office Action for JP Application No. 2023-535942 dated Jul. 16, 2024 (5 pages).
English Translation of JP Office Action for JP Application No. 2023-535942 dated Jul. 16, 2024 (7 pages).
Korean Office Action for Korean Application No. 10-2023-7022002 dated Dec. 18, 2024 (8 pages).
English Translation of Korean Office Action for Korean Application No. 10-2023-7022002 dated Dec. 18, 2024 (8 pages).

* cited by examiner

PROFILE CLAMP, FLANGE CONNECTION, AND TURBOCHARGER COMPRISING SAME

INTRODUCTION

The disclosure concerns a profile clamp, a flange connection, and a turbocharger comprising such a flange connection.

A profile clamp may be used e.g. for fluid-tight connection of two pipe ends or two housings which are equipped with radially outwardly oriented flanges. Here, the flanges are positioned relative to one another and the profile clamp placed on the flanges with a clampable, divided profile strip. The flanges are fixed relative to one another by tightening the profile clamp, wherein axial and radial holding forces act on the flanges. For this, a profile strip of the profile clamp usually has a U-shaped or V-shaped cross-section which is brought into superficial contact with the flanges. A generic profile clamp is shown for example in DE 10 2009 039 862 A1.

The disadvantage of such a clamp may be that in various technical applications, components with flanges to be connected are stressed because of torsional forces. These are however not adequately countered by the axial and radial clamping forces of the profile clamp. Such torsional forces prevail for example in the connection between a turbine casing and a compressor casing of a turbocharger. These can lead to a relative twist of the connecting components. So in turbochargers, high clamping forces of the profile clamp are used, with which sufficient friction is generated to counter the relative twist. These necessary high clamping forces diminish however over time due to creeping, expansion, temperature fluctuations, loosening of connecting means and similar.

SUMMARY

An object of the disclosure, per an embodiment, is therefore to develop technical solutions, by means of which torsional forces between two component flanges connected by a profile clamp can be reliably and persistently better countered. These technical solutions can be implemented in minimal installation space and have a low cost.

The disclosure concerns a profile clamp comprising a profile strip which extends in a circumferential direction about a clamp center and has two clamping heads which are connected to one another via a clamping element, wherein a profile groove running in the circumferential direction is formed on an inside of the profile strip and has a profile strip base arranged at least in portions between groove flanks. It is provided that this profile clamp has a securing feature on the inside of the profile strip which either protrudes into the profile groove or protrudes from the profile strip base in the direction of the clamp center, or protrudes into the profile groove and from the profile strip base in the direction of the clamp center.

On connection of two component flanges, the profile clamp according to an embodiment may ensure that the profile groove can still apply axial clamping forces to the component flange and secure the component flange against displacement in the transverse direction, while the securing feature provides additional prevention against twisting of the profile clamp relative to the first and/or second component flange, and preferably, per an embodiment, between the first and second component flanges. This twist prevention may also be permanently sustained even if the clamping force of the profile clamp diminishes over time because of creeping, expansion, temperature fluctuations, loosening of connecting means and similar. The solution may in principle be used for all applications in which a profile strip must connect two flanges, and in which higher requirements for resistance to slip torque are necessary.

In this profile clamp, the profile groove may have a V-shaped or U-shaped cross-section. This is geometrically simple to produce and suitable for clamping the two flanges against one another with axial force in the longitudinal direction.

Optionally, the profile strip may have a V-shaped or U-shaped cross-section. This is particularly easy to produce. Furthermore, the profile strip may consist of metal. Production is particularly economic if the profile strip is produced by shaping a metal plate.

According to an embodiment of the profile clamp, the securing feature has a first securing pin which protrudes into the profile groove or protrudes from the profile clamp base in the direction of the clamp center, or protrudes into the profile groove and from the profile clamp base in the direction of the clamp center. Such a securing pin is economic and usually sufficient to form a sufficiently stable prevention against twisting. In most applications, the torsional forces are not expected to be so high that the securing pin could shear off.

In an embodiment, the securing feature has a second securing pin which protrudes into the profile groove or from the profile strip base in the direction of the clamp center, or protrudes into the profile groove and from the profile clamp base in the direction of the clamp center, wherein the second securing pin is offset to the first securing pin in the circumferential direction, and/or is offset to the first securing pin in a longitudinal direction of the profile clamp running transversely to the circumferential direction.

An offset in the circumferential direction is suitable for increasing the torsional forces which can be absorbed by the securing feature. This may simply be a doubling of the absorbable forces. Alternatively, the securing pin may also be designed for absorbing force in one of the two circumferential directions. Then the first and second securing pins may be oriented in opposite directions so that equally large torsional forces can be absorbed in both circumferential directions.

In contrast, an offset in the longitudinal direction may serve to ensure that the first securing pin engages only with the first component flange, while the second securing pin engages only with the second component flange. Cutouts in the component flanges do not then for example reduce the contact area between the two component flanges, e.g. if a seal is arranged there. The first and the second securing pins may each be arranged on one of the groove flanks and protrude from there into the profile groove.

Optionally, it is provided that the first and/or second securing pin are from the group bolts, pins, pegs, teeth, tines, mandrels and cams.

Furthermore, the securing feature may comprise at least one separate component which is connected to the profile strip. This allows securing features with very free material thickness and form.

A particularly economic embodiment is achieved if the securing feature is formed integrally with the profile strip, in particular by shaping. Then fewer components and mounting steps are necessary in production.

According to a possible embodiment, the securing feature protrudes from the profile strip base between the groove flanks. Thus the groove flanks remain stable.

In an embodiment, the groove flanks are interrupted in the region of a bridging portion of the profile strip base. Such a bridging portion facilitates opening of the profile clamp during mounting. It then acts as a flexure hinge. The profile strip is preferably formed, per an embodiment, integrally inclusive of the two clamping heads. The bridging portion may however also form a connection between two part portions of the profile strip. Thus it is possible that a bridging element which is fixedly connected to the two part portions forms a flexure hinge, or a movable connection between the two part portions is formed.

In an embodiment, it is provided that the groove flanks are interrupted in the region of a bridging portion of the profile strip base, and the securing feature protrudes from the profile strip base in the direction of the clamp center in the region of the bridging portion. Here the securing feature is easy to locate and align on mounting.

The disclosure furthermore concerns, per an embodiment, a flange connection comprising a first and a second component flange which are arranged opposite one another in a longitudinal direction, wherein the first and second component flanges each have a cutout, wherein a profile clamp as described above and below clamps the two component flanges together, wherein the securing feature protrudes into the two recesses and thereby prevents twisting between the first and the second component flanges.

Thus, by form fit, the securing feature prevents twisting of the profile clamp relative to the first and second component flanges, and hence also between the first and second component flanges. This twist prevention is also permanently maintained even if the clamping force of the profile clamp diminishes over time due to creeping, expansion, temperature fluctuations, loosening of connecting means and similar. The solution may in principle be used for all applications in which a profile strip must connect two component flanges, between which higher requirements for resistance to slip torque are necessary.

According to an embodiment, the cutouts of the first and second component flanges are arranged opposite one another and together form a securing recess which forms an insertion opening facing radially outward, wherein the securing feature protrudes into the securing recess and prevents twisting in that it extends into the cutouts of the first and second component flanges.

Firstly, in a simple fashion, this achieves a positional orientation of the first and second component flanges before the profile clamp is mounted, in that the two cutouts are positioned relative to one another. Also, with a simply designed form of the securing feature, a direct twist prevention is formed between the first and second component flanges.

Each component flange comprises an oblique clamping flank which in particular corresponds to the cross-sectional form of the profile groove and is in contact with the groove flanks for clamping.

Optionally, the cutouts are made sufficiently deep that cutout bases of the cutouts facing towards of the clamp center and the securing feature are arranged spaced apart from one another. Thus the profile clamp can be tightened without colliding with the cutout bases.

In an embodiment, the cutouts are designed sufficiently wide that cutout walls of the cutouts facing in the longitudinal direction and the securing feature are arranged spaced apart from one another. Thus the securing feature does not collide with the component flanges in the longitudinal direction, and an even clamping is achieved in the longitudinal direction over the circumference of the component flange.

A design is also possible in which the securing feature has a play in the cutouts in the circumferential direction. This play facilitates mounting. Minimal twisting within the scope of the play is only harmful in very few applications.

The disclosure also concerns, per an embodiment, a turbocharger with a flange connection as described above and below, wherein the first component flange and the second component flange are each formed on a component of the group turbine casing, optional intermediate casing and consumer casing, wherein a drive shaft extends from the turbine casing through the flange connection into the consumer casing, wherein the drive shaft is driven by a turbine wheel in the turbine casing, and wherein the drive shaft drives a consumer in the consumer casing.

In particular with such turbochargers, the simple design of twist prevention with the profile clamp is particularly beneficial, per certain embodiments. The latter can be made compact and lightweight, and the extremely hot components of the turbocharger do not change their position in the engine bay because of a relative twist. Thus the entire periphery of the turbocharger including its supply and outlet pipes and electrical connections is protected. The thermal loads cannot adversely affect the twist prevention.

In particular, per an embodiment, a bearing with or without seal for the drive shaft may be arranged in the optional intermediate casing. Alternatively, also a bearing with or without seal for the drive shaft may be arranged in the turbine casing or the consumer casing.

Optionally, it may be provided that the turbocharger has two flange connections as described above and below, wherein the first component flange and the second component flange of the first of the two flange connections are formed on a turbine casing and an intermediate casing, and wherein the first component flange and the second component flange of the second of the two flange connections are formed on the intermediate casing and on a consumer casing, wherein a drive shaft extends from the turbine casing through the intermediate casing and the two flange connections into the consumer casing, wherein the drive shaft is driven by a turbine wheel in the turbine casing, and wherein the drive shaft drives a consumer in the consumer casing.

Both in variants with one flange connection and also in those with two flange connections, a seal between the turbine wheel and the consumer is formed in the turbine casing and/or in the consumer casing. This seal preferably comprises, per an embodiment, a shaft passage for the drive shaft. The turbine casing furthermore preferably has, per an embodiment, an exhaust gas inlet and an exhaust gas outlet.

Optionally, the consumer casing may comprise a supply air connection and a compressed air outlet, wherein the consumer is a compressor wheel. Thus compressed combustion air may be provided.

Alternatively or additionally, the consumer may be a transmission, in particular to form a turbo-compound engine.

Furthermore, alternatively or additionally, the consumer may be an electrical generator.

Mixed forms of these different consumers are also conceivable.

BRIEF DESCRIPTION OF THE FIGURES

Further features, details and advantages of the disclosure arise from the wording of the claims and the following description of exemplary embodiments with reference to the drawings. In the drawings:

DETAILED DESCRIPTION

Figure 1:
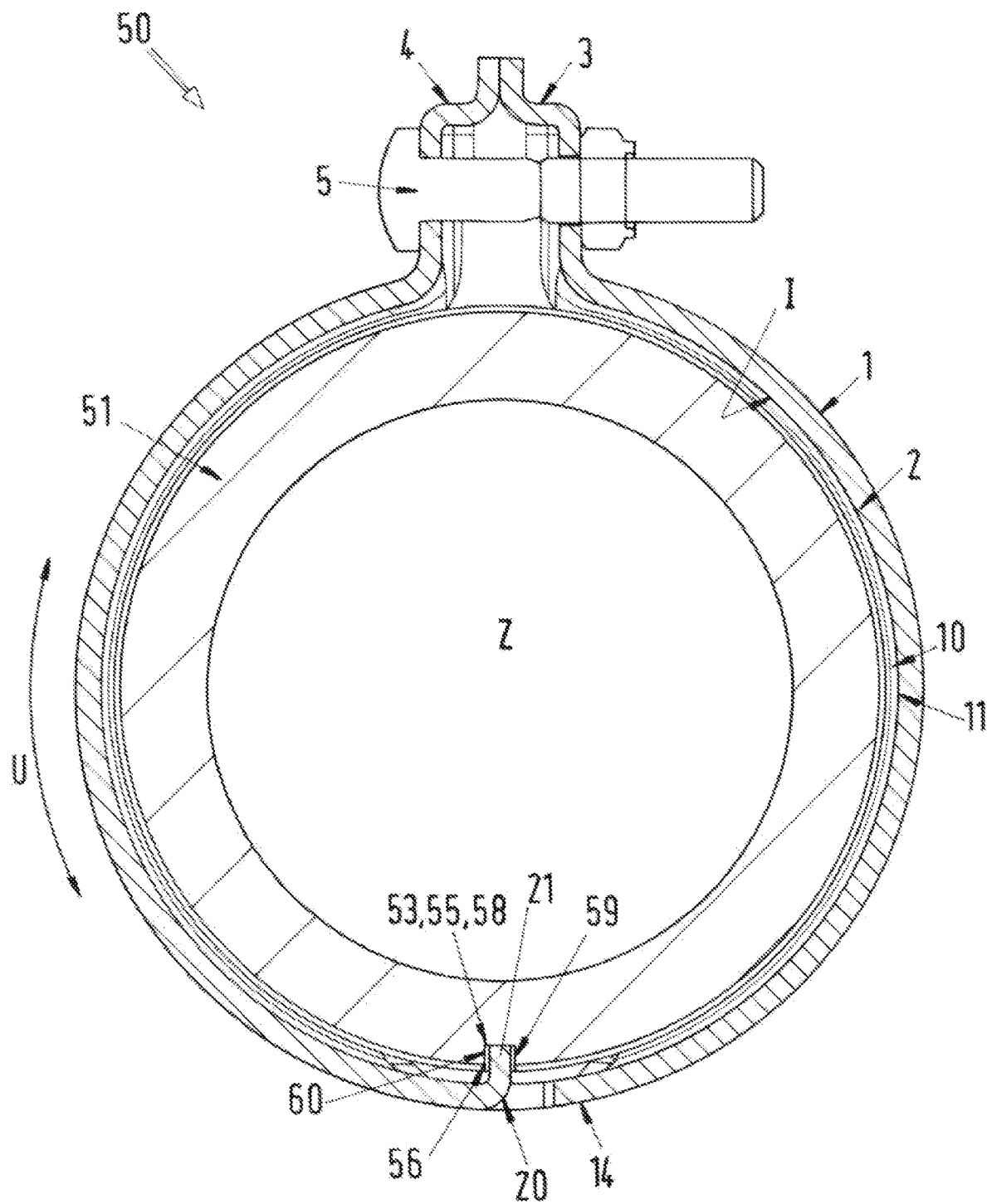
FIG. 1 shows a cross-section through a flange connection with a profile clamp.

FIG. 1 shows a cross-section through a flange connection 50 with a profile clamp 1. This profile clamp is shown in a perspective view in FIG. 2. The same reference signs therefore relate to the same features and are described jointly.

The profile clamp 1 substantially comprises a profile strip 2 which extends in a circumferential direction U about a clamp center Z and has two clamping heads 3, 4. The two clamping heads 3, 4 are connected together by a clamping element 5, namely a bolt with nut.

A profile groove 10 is formed running in the circumferential direction U on an inside I of the profile strip 2. The profile groove 10 has a profile strip base 11 which is arranged in portions between groove flanks 12, 13. Thus the profile groove 10 has a V-shaped cross-section which, with wider width and rounder form, may also be regarded as a U-shaped. The profile strip 2 is made by shaping a metal plate, wherein the profile strip 2 itself also has a V-shaped or U-shaped cross-section.

The groove flanks 12, 13 are interrupted in the region of a bridging portion 14 of the profile strip base. The bridging portion 14 lies opposite the clamping heads 3, 4 in the circumferential direction U and forms a flexible hinge.

In the region of the bridging portion 14, the profile clamp 1 has a securing feature 20 on the inside I of the profile strip 2, which extends from the profile strip base 11 in the direction of the clamp center Z. The securing feature 20 is a first securing pin 21 which protrudes from the profile strip base 11 in the direction of the clamp center Z. This securing pin 21 is integrally formed as a tooth or tine by shaping with the profile strip 2.

Figure 5:
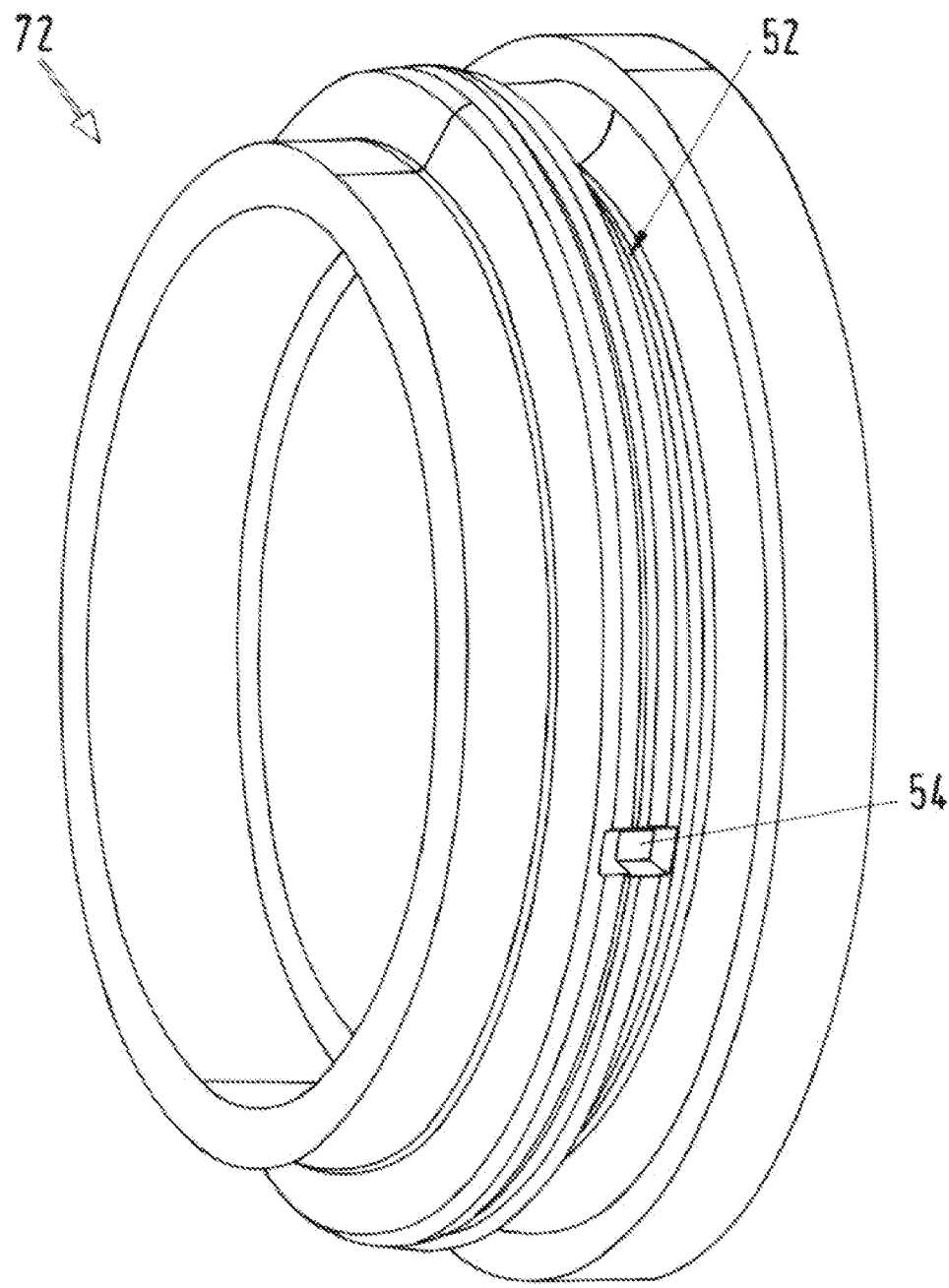
FIG. 5 shows an extract of a consumer casing with a second component flange.

As evident from the flange connection 50 in FIG. 1, the securing feature 20—here the securing pin 21—engages in a cutout 53. Firstly therefore, the structure of the component flanges 51, 52 will be described in more detail with reference to FIGS. 5 and 6.

Figure 6:
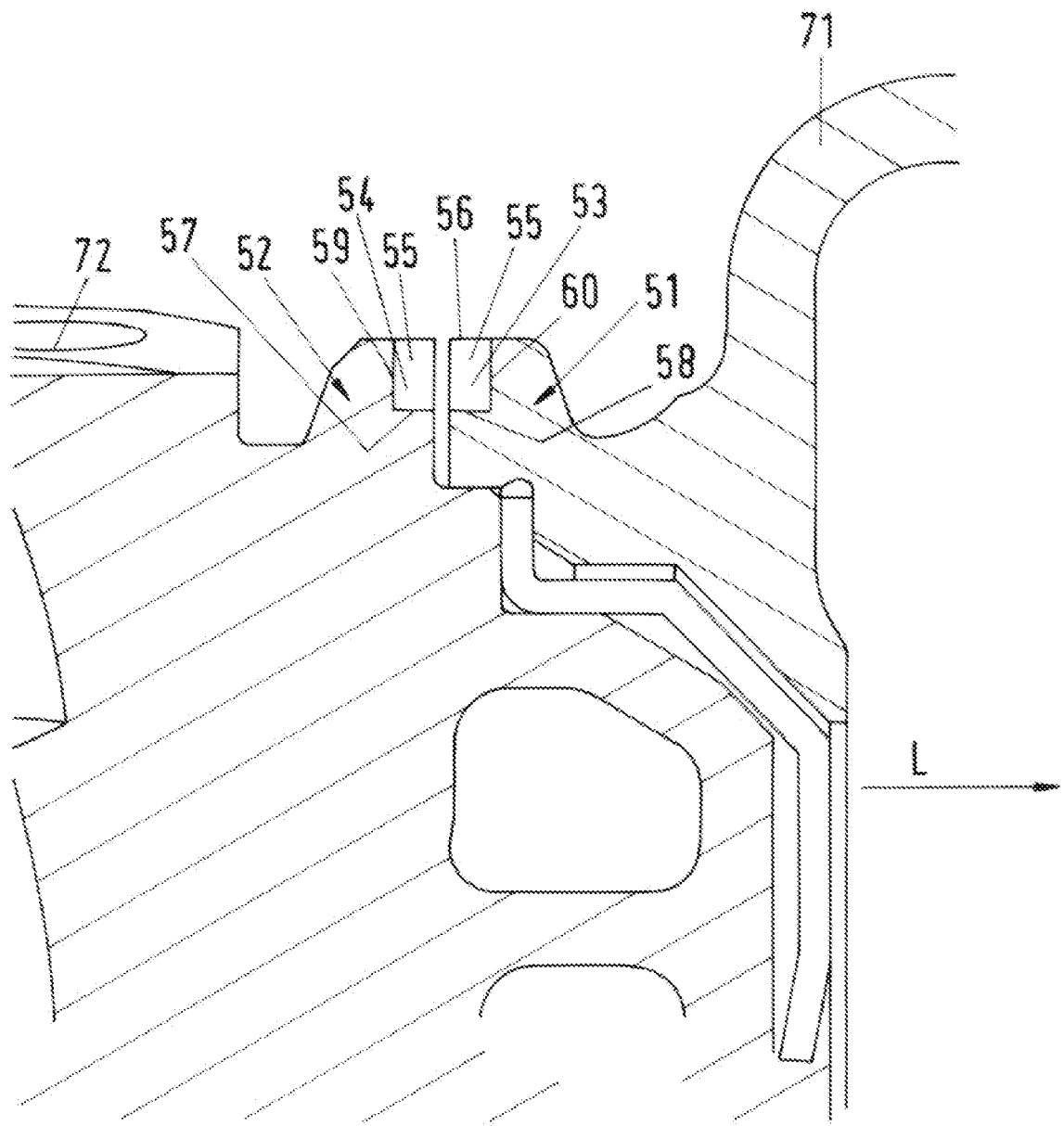
FIG. 6 shows an extract of a cross-section through the one consumer casing and one turbine casing, which are arranged with adjoining first and second component flanges.

According to FIG. 6, a first and a second component flange 51, 52 are arranged opposite one another in a longitudinal direction L. The component flanges 51, 52 each have an oblique clamping flank, which in particular correspond to the cross-sectional form of the profile groove 10 and, for clamping, are in contact with the groove flanks 12, 13.

The first and second component flanges 51, 52 each have a cutout 53, 54, wherein the cutout 54 of the second component flange 52 can also be seen in perspective view in FIG. 6. The cutouts 53, 54 of the first and second component flanges 51, 52 are arranged opposite one another in the longitudinal direction L and together form a securing recess 55 with an insertion opening 56 facing radially outward.

Here the securing feature 20 from FIG. 1 engages in this securing recess 55 in FIG. 6, and thus prevents twisting between the first and second component flanges 51, 52 since it extends into the cutouts 53, 54 of the first and second component flanges 51, 52. The profile clamp 1 also clamps the two component flanges 51, 52 together. This clamping mainly takes place in the longitudinal direction L. Transversely to the longitudinal direction L, the component flanges 51, 52 are positionally fixed in that the component 72 with the second component flange 52 engages snugly in the component 71 with the first component flange 51.

The cutouts 53, 54 and hence also the securing recess 55 are made sufficiently deep that cutout bases 57, 58 of the cutouts 53, 54 facing towards the clamp center Z and the securing feature 20 are arranged slightly spaced apart from one another after clamping. The cutouts 53, 54 should also be made sufficiently wide that cutout walls 59, 60 of the cutouts 53, 54 facing in the longitudinal direction L and the securing feature 20 are also arranged spaced apart from one another after clamping. Evidently, in the circumferential direction U, the securing feature 20 has some play in the cutouts 53, 54.

Figure 2:
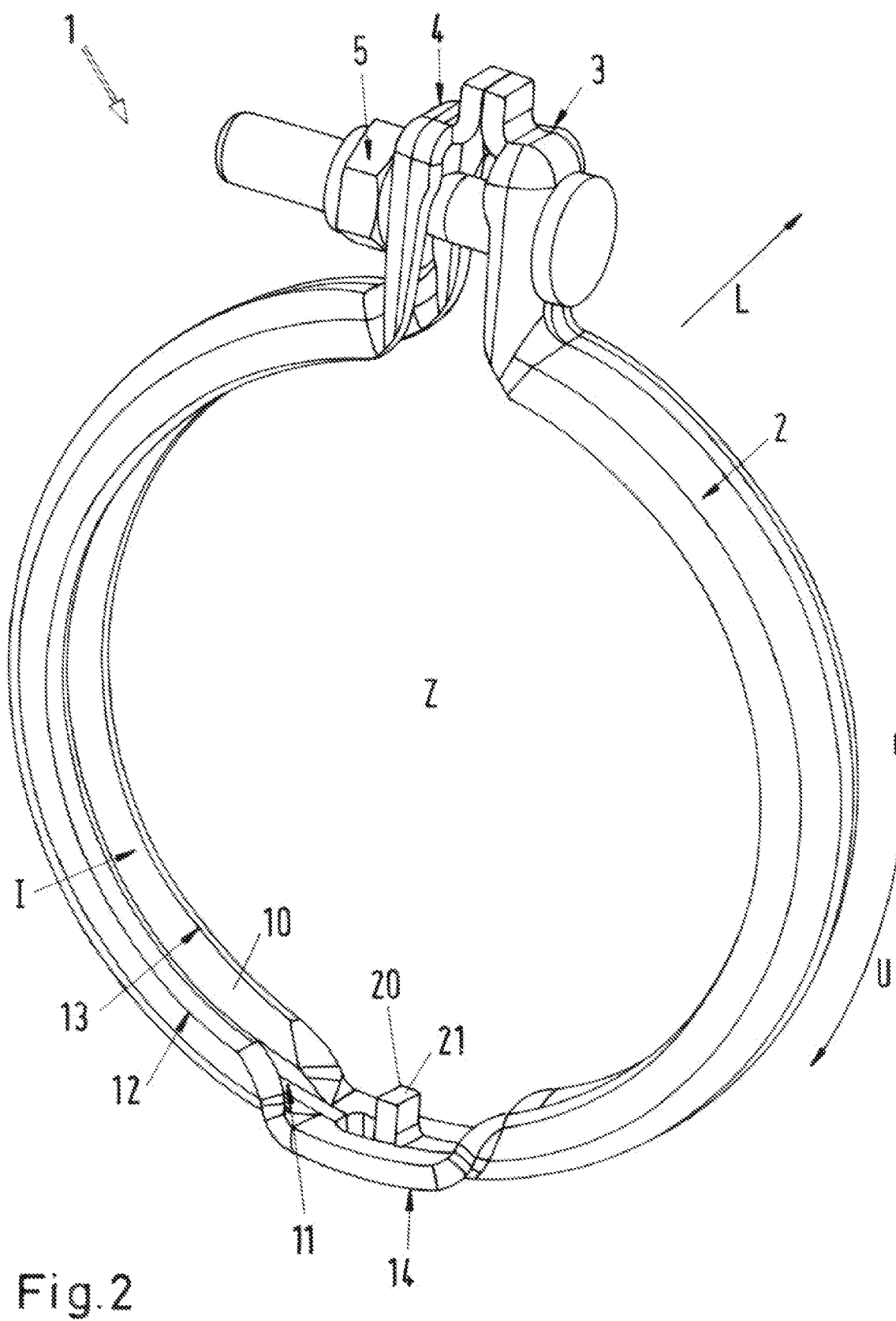
FIG. 2 shows a perspective view of the profile clamp in FIG. 1.
Figure 3:
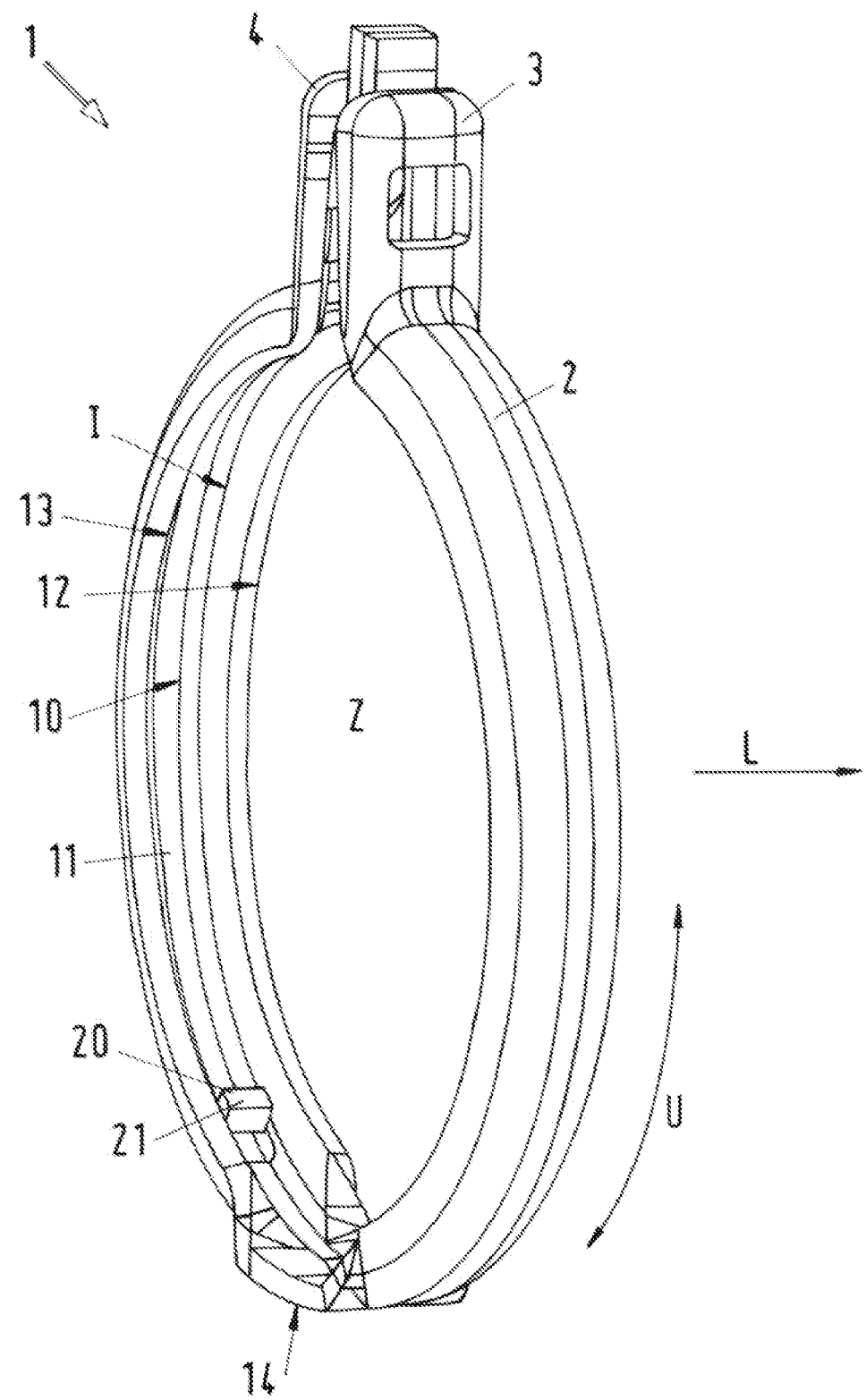
FIG. 3 shows a perspective view of a profile clamp.

FIG. 3 shows a perspective view of a profile clamp 1 which differs from the design in FIGS. 1 and 2 with respect to securing feature 20. Instead of a securing feature 20 in the region of the bridging region 14, the profile clamp 1 according to FIG. 3 has a securing feature 20 on the inside I of the profile strip 2, which protrudes into the profile groove 10 and hence in particular from the profile strip base 11 between the groove flanks 12, 13.

Figure 4:
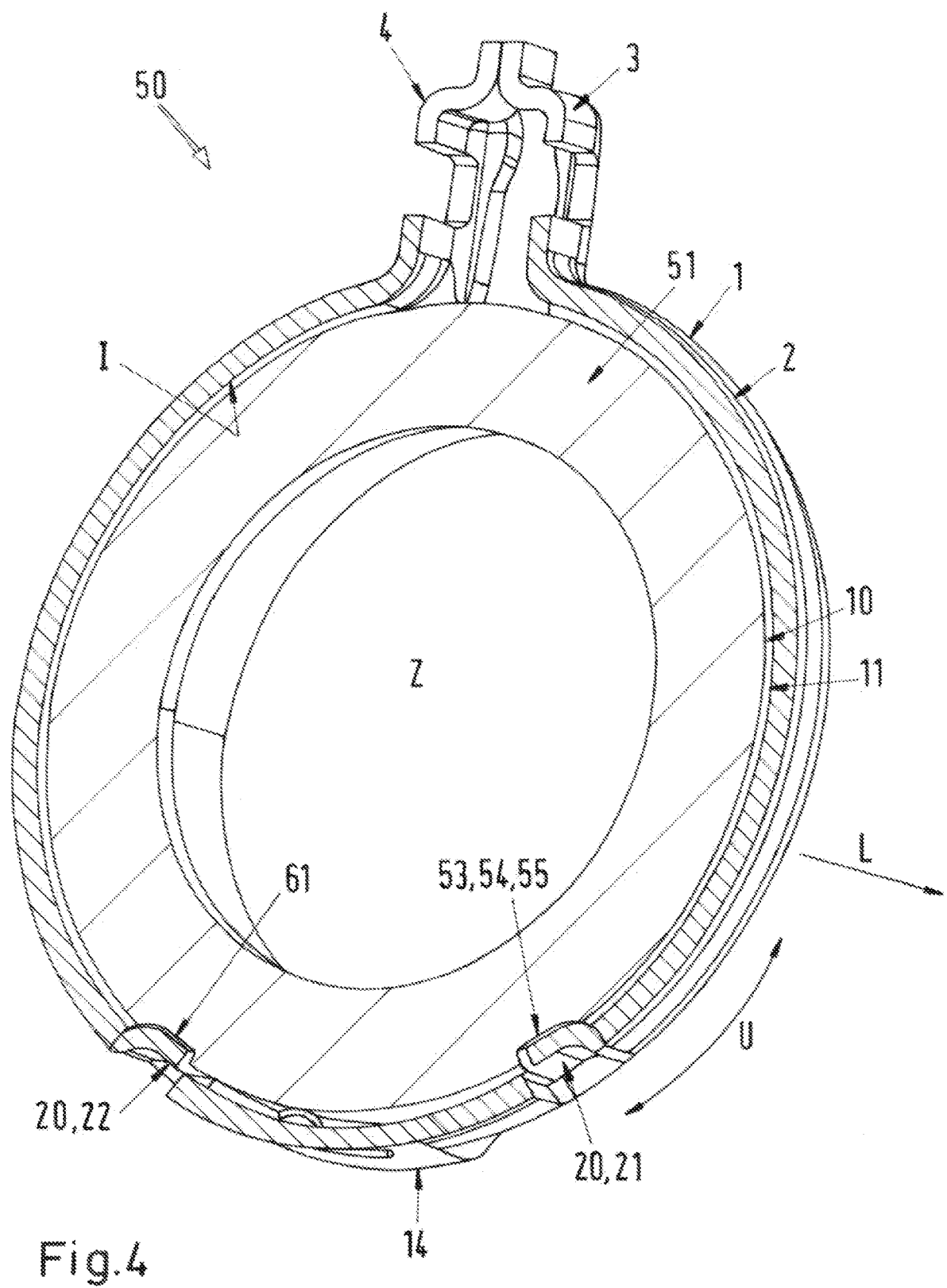
FIG. 4 shows a perspective cross-section through a flange connection with the profile clamp.

The profile clamp 1 according to FIG. 4 also differs with respect to the securing feature 20. Here, the securing feature 20 has a first and a second securing pin 21, 22 which are arranged at around 1 o'clock and 11 o'clock relative to the bridging portion 14, and which each protrude into the profile groove 10 and from the profile strip base 11 in the direction of the clamp center Z. Thus the first and second securing pins 21, 22 are arranged offset to one another in the circumferential direction U. To prevent twisting, the second securing pin 22 corresponds to a securing recess 61 which is formed by two cutouts adjacent in the longitudinal direction L, one in each of the component flanges 51, 52.

Optionally, the first and second securing pins 21, 22 could also be arranged offset to one another in the longitudinal direction L of the profile clamp 1, and each engage only in one cutout 53, 54 of a component flange 51, 52.

The component 71 with the first component flange 51 in FIG. 6 is an extract of a turbine casing 71. The component 72 with the second component flange 52 is an extract of a consumer casing 72.

Figure 7:
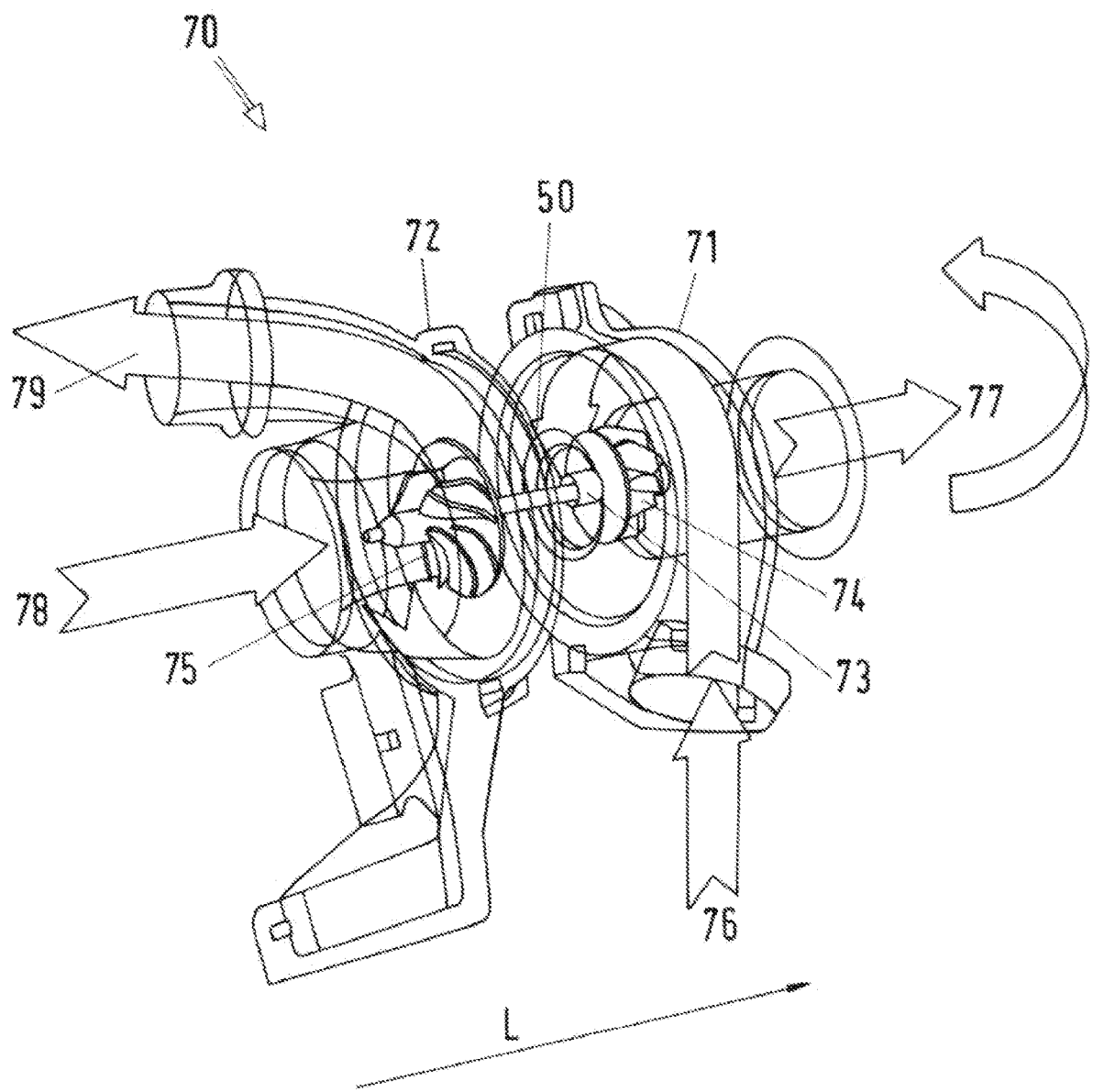
FIG. 7 shows a partially transparent illustration of a turbocharger.

The turbine casing 71 and consumer casing 72 may belong to a turbocharger 70 according to FIG. 7, wherein the turbine casing 71 and consumer casing 72 are connected together by means of one of the above-described flange connections 50. In the partially transparent illustration of the turbocharger 70 according to FIG. 7, it is clear that a drive shaft 73 extends from the turbine casing 71 through the flange connection 50 into the consumer casing 72. The drive shaft 73 is driven by a turbine wheel 74 in the turbine casing 71. In the consumer casing 72, the drive shaft 73 drives a consumer 75, namely a compressor wheel. Between the turbine wheel 74 and the consumer 75, a seal is formed in the turbine casing 71 and/or in the consumer casing 72, so that a compressor chamber in the consumer casing 72 and a drive chamber in the turbine casing are separated from one another. An exhaust gas inlet 76 and an exhaust gas outlet 77 open into the drive chamber of the turbine casing 71. On the other side, a supply air connection 78 opens into the compressor chamber of the consumer housing 72, and a compressed air outlet 79 leads out of the compressor chamber.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

The invention is not restricted to one of the above-described embodiments but may be varied in many ways.

In particular, the number and form of the safety features and recesses in the component flanges may be adapted by the person skilled in the art according to the objectives of the technical application in each case.

All features and advantages arising from the claims, the description and the drawing, including structural details, spatial arrangements and method steps, may be essential to the invention both alone and also in widely varying combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Profile clamp
2 Profile strip
3 Clamping head
4 Clamping head
5 Clamping element
10 Profile groove
11 Profile strip base
12 Groove flank
13 Groove flank
14 Bridging portion
20 Securing feature
21 First securing pin
22 Second securing pin
50 Flange connection
51 First component flange
52 Second component flange
53 Cutout
54 Cutout
55 Securing recess
56 Insertion opening
57 Cutout base
58 Cutout base
59 Cutout wall
60 Cutout wall
61 Securing recess
70 Turbocharger
71 Turbine casing
72 Consumer casing
73 Drive shaft
74 Turbine wheel
75 Consumer
76 Exhaust gas inlet
77 Exhaust gas outlet
78 Supply air connection
79 Compressed air outlet
I Inside
L Longitudinal direction
U Circumferential direction
Z Clamp center

The invention claimed is:

1. A flange connection comprising a first and a second component flange which are arranged opposite one another in a longitudinal direction, wherein the first and second component flanges each have a cutout, and comprising a profile clamp,
the profile clamp comprising a profile strip which extends in a circumferential direction about a clamp center and has two clamping heads which are connected to one another via a clamping element, wherein a profile groove running in the circumferential direction is formed on an inside of the profile strip and has a profile strip base arranged at least in portions between groove flanks of the profile groove, wherein the clamp has a securing feature on the inside of the profile strip, which
a) protrudes into the profile groove and/or
b) protrudes from the profile strip base in the direction of the clamp center,
wherein the profile strip is produced by shaping a metal plate and has a V-shaped or U-shaped cross-section;
wherein the securing feature is formed integrally with the profile strip by shaping, and
wherein the securing feature protrudes from the profile strip base between the groove flanks,
and wherein the profile clamp clamps the two component flanges together, wherein the securing feature protrudes into the cutouts of the first and second component flanges and thereby prevents twisting between the first and the second component flanges.

2. The flange connection as claimed in claim 1, wherein the cutouts of the first and second component flanges are arranged opposite one another and together form a securing recess forming an insertion opening facing radially outward, wherein the securing feature protrudes into the securing recess and prevents twisting in that it extends into the cutouts of the first and second component flanges.

3. The flange connection as claimed in claim 1, wherein the cutouts are made sufficiently deep that cutout bases of the cutouts facing towards the clamp center and the securing feature are arranged spaced apart from one another.

4. The flange connection as claimed in claim 1, wherein the cutouts are designed sufficiently wide that cutout walls of the cutouts facing in the longitudinal direction and the securing feature are arranged spaced apart from one another.

5. The flange connection as claimed in claim 1, wherein the securing feature has a play in the cutouts in the circumferential direction.

6. A turbocharger with a flange connection as claimed in claim 1, wherein the first component flange and the second component flange are each formed on a component selected from the group consisting of a turbine casing, an intermediate casing and a consumer casing, wherein a drive shaft extends from the turbine casing through the flange connection into the consumer casing, wherein the drive shaft is driven by a turbine wheel in the turbine casing, and wherein the drive shaft drives a consumer in the consumer casing.

* * * * *